United States Patent [19]
Meline et al.

[11] Patent Number: 4,939,445
[45] Date of Patent: * Jul. 3, 1990

[54] PIVOTED ARM CAPACITIVE EXTENSOMETER

[75] Inventors: Harry R. Meline, Minnetonka; Eric L. Paulsen, Wayzata, both of Minn.

[73] Assignee: MTS Systems Corporation, Eden Prairie, Minn.

[*] Notice: The portion of the term of this patent subsequent to May 23, 2006 has been disclaimed.

[21] Appl. No.: 348,866

[22] Filed: May 8, 1989

Related U.S. Application Data

[63] Continuation-in-part of Ser. No. 103,538, Oct. 1, 1987, Pat. No. 4,841,226, which is a continuation-in-part of Ser. No. 893,799, Aug. 6, 1986, Pat. No. 4,831,738.

[51] Int. Cl.⁵ .................................................. G01D 7/02
[52] U.S. Cl. ........................................ 324/663; 33/789; 73/780
[58] Field of Search ............... 324/61 R, 61 P; 73/780, 73/781, 782; 33/789

[56] References Cited

U.S. PATENT DOCUMENTS

| | | | |
|---|---|---|---|
| 2,968,031 | 1/1961 | Higa | 340/265 |
| 3,206,970 | 9/1965 | Dally et al. | 73/88.5 R |
| 3,400,331 | 9/1968 | Harris | 324/61 |
| 3,729,985 | 5/1973 | Sikorra | 73/88.5 R |
| 3,789,508 | 2/1974 | Meline | 33/148 D |
| 3,852,672 | 12/1974 | Nelson | 328/1 |
| 4,098,000 | 7/1978 | Egger | 33/148 D |
| 4,449,413 | 5/1984 | Pugh | 73/780 |
| 4,532,810 | 8/1985 | Prinz et al. | 33/147 D |
| 4,831,738 | 5/1989 | Meline et al. | 73/780 |

FOREIGN PATENT DOCUMENTS 3410840 6/1985 Fed. Rep. of Germany.

OTHER PUBLICATIONS

Holmes, Alan M. C. and Michael C. Dugan, "Clip-On Extensometer", *NASA Tech Briefs*, pp. 96 and 97, Jan.-/Feb. 1986.

*Primary Examiner*—Reinhard J. Eisenzopf
*Assistant Examiner*—Maura K. Regan
*Attorney, Agent, or Firm*—Kinney & Lange

[57] ABSTRACT

A capacitive extensometer has an extensometer frame formed of a pair of arms having first ends with specimen contacting members and which are connected together about a hinge axis at second remote ends. The specimen contacting members engage the surfaces of a specimen to be tested. A capacitive type sensing arrangement is mounted on the arms, and is used with conventional circuitry for determining arm motion. The sensing members are located to insure adequate output, and can be located to the exterior of the periphery of the extensometer arm assembly. The ability to mount the capacitor sensor appropriately, while obtaining a relatively large output signal enhances the operability of the extensometer.

7 Claims, 4 Drawing Sheets

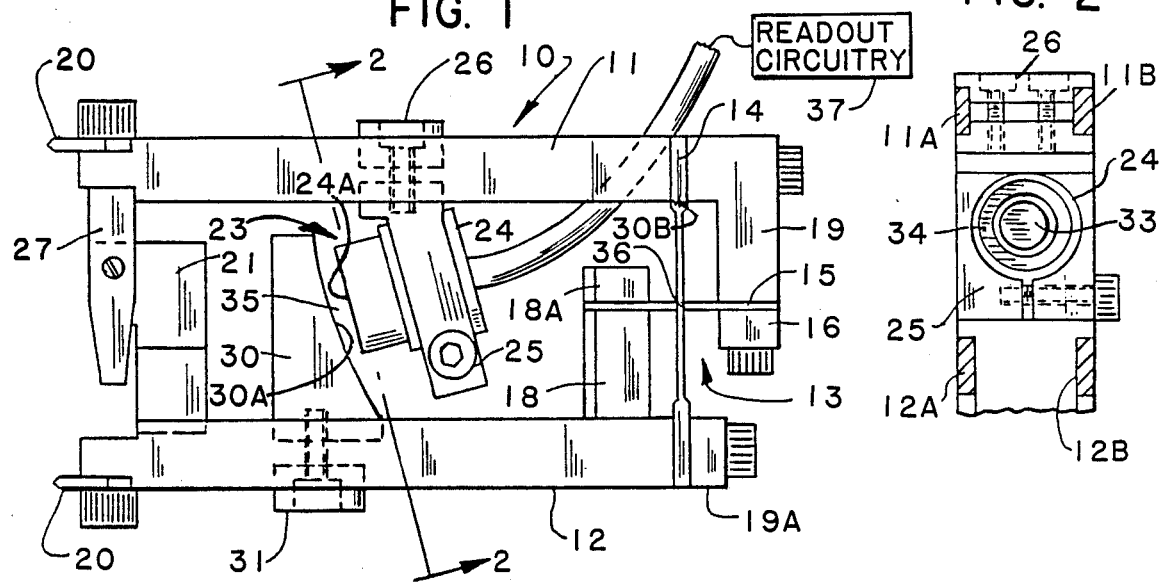
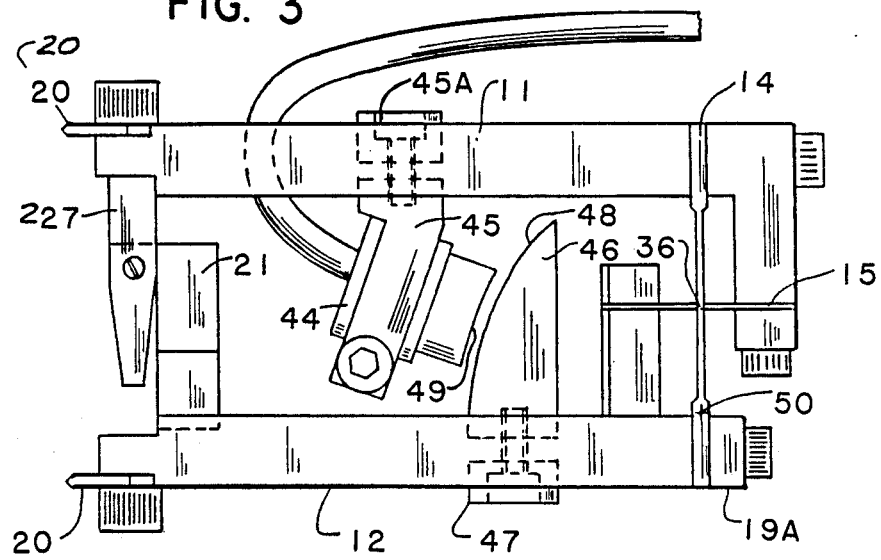

PIVOTED ARM CAPACITIVE EXTENSOMETER

CROSS REFERENCE TO RELATED APPLICATIONS

This application is a continuation-in-part of co-pending application Ser. No. 07/103,538, filed Oct. 1, 1987, now U.S. Pat. No. 4,841,226, which in turn was a continuation-in-part of co-pending application Ser. No. 06/893,799, filed Aug. 6, 1986, now U.S. Pat. No. 4,831,738.

BACKGROUND OF THE INVENTION

1. Field of the Invention

The present invention relates to capacitive extensometers.

2. Description of the Prior Art.

Extensometers are commonly used for measuring strain in a specimen and include devices which utilize two arms held together by suitable cross flexure members as shown in U.S. Pat. No. 3,789,508. Strain gages applied to the cross flexure members are used for determining arm separation, and thus, specimen strain.

Capacitive sensing extensometers are known as well, but generally they are complex in operation, hard to adjust, and are not rugged and easily attached to the specimens.

SUMMARY OF THE INVENTION

The present invention relates to a strain sensing extensometer having a capacitive reactance detector mounted on one of a pair of pivotally movable mounting arms joined by flexure straps, and adapted to engage a specimen, the strain of which is to be sensed by movement at the other ends of the arms. A capacitive reactance sensor is mounted between the arms so that strain in the specimen, resulting in arm movement, changes the signal from the capacitive sensor. Preferably a capacitive reactance detector is mounted on one arm and faces a target so that upon movement of the arms, when a specimen to which the arms are coupled is subjected to load, a change in spacing between the target and detector is sensed and the amount of change in signal is proportional to the strain in the specimen.

The present construction is a rugged extensometer that provides a very usable signal with small amounts of arm movement, and which is easily mounted and adjusted. The sensors as shown may be located exterior of the arms. That is, in one form of the invention, the sensor is on an opposite side of the arm pivot axis from the specimen and in another form below the arms and centered on a plane passing through the arm pivot axis and parallel to the specimen axis.

The capacitive reactance sensors used are known. The preferred capacitive reactance detecting probes have a center circular capacitive plate and an outer concentric sleeve capacitive plate, commonly called a guard ring. These rings do not move relative to each other, but provide a signal depending on the proximity of the probe end to a conductor target surface. For example, cylindrical capacitive reactance sensing probes made by Hitec Products, Inc. of Ayer, Mass., and sold as their HPC Series probes under the trademark "Proximic" have been shown to be suitable.

Properly configuring the target surface and positioning the target and moving the relatively movable members permits compensation for nonlinearities in the system. Mechanical compensation simplifies or eliminates the need for the correction or linearizing electronic circuitry that is commonly required, and enhances accuracy.

BRIEF DESCRIPTION OF THE DRAWINGS

FIG. 1 is a side elevational view of a capacitive extensometer made according to the present invention;

FIG. 2 is a sectional view taken as on line 2—2 of FIG. 1;

FIG. 3 is a side view of an extensometer made according to a modified form of the present invention showing a convex curved surface on the target and a mating surface of a capacitive reactance probe;

DETAILED DESCRIPTION OF THE PREFERRED EMBODIMENTS

Figure 4:
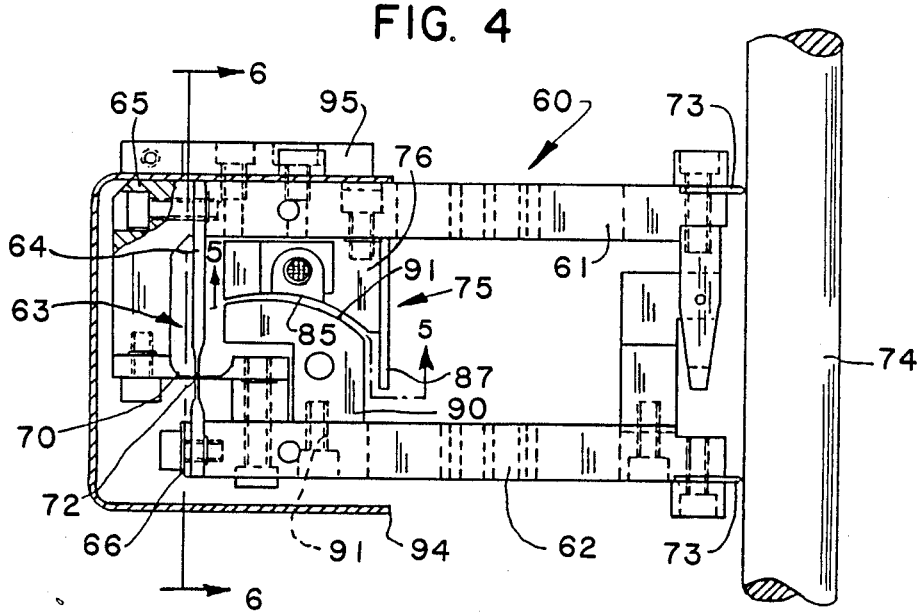
FIG. 4 is a side elevational view of a preferred form of the capacitive extensometer of the present invention illustrating a convex surface target and a mating complementarily-shaped surface on a capacitive reactance probe.

FIGS. 1 and 2 show an extensometer assembly indicated generally at 10, having a first arm 11, and a second arm 12 mounted together with a flexure assembly 13 comprising a first flexure strap or member 14 and a second flexure strap or member 15. This is a conventional cross flexure mounting assembly wherein the planes of the flexure members intersect and the flexure member 15 passes through an opening in the center of the flexure member 14. One end of the flexure strap or member 15 is clamped with a suitable clamp plate 16 to a block 19 which is used to clamp flexure member 14 to the arm 11. The other end of the flexure member 15 is clamped to the arm 12 with a clamping block indicated at 18 fixed to arm 12. A plate 18A is used to clamp the end of strap 15 to the block 18 As stated, one end of flexure member 14 is clamped to the end of the arm 11 with block 19, and the opposite end of the flexure member 14 is clamped with clamp member 19A to the end of arm 12.

The arms 11 and 12 have suitable knife edges 20 for engaging a specimen to be tested, and an over travel stop assembly 21 that is used in a normal manner.

A capacitive type sensing assembly is shown at 23, and utilizes a capacitive reactance type proximity detector 24 mounted on a suitable adjustable bracket 25 that clamps the proximity detector (which is cylindrical as can be seen in FIG. 2) in position. An adjustable clamp 26 is used for clamping the bracket 25 to the arm 11 and permitting it to be adjusted in position longitudinally along the arms 11 toward and away from a conductive target member indicated generally at 30 which can be sensed by the proximity detector 24. The target 30 is made to slide along the arm 72 and can be secured with a clamp 31 that can be loosened for permitting the target 30 to be slid longitudinally, and then reclamped with the target in the desired position. The arm 11 as shown comprises two parallel side legs 11A and 11B which receive the clamp 26. The arm 12 has a pair of legs 12A and 12B that receive the clamp 31.

As can be seen in FIG. 2, the proximity detector 24 includes a first center circular capacitive plate 33 and a second outer concentric sleeve-type capacitive plate 34, commonly called a guard ring. These plates 33 and 34 are electrically insulated from each other and comprise capacitive reactance detectors to detect the gap between the target member 30, in particular, the surface 30A of the target member 30, and the adjacent end of the proximity detector 24. This gap is shown at 35 in FIG. 1 and it can be seen that by making the surface 30A other than a cylindrical surface concentric with the axis of pivot 36 of the flexure members 14 and 15, the proximity detector 24 will move toward or away from the surface 30A as the arms 11 and 12 pivot toward and away from each other as a specimen which the knife edges 20 are engaging is loaded. The change in relative position of the arms 11 and 12 is detected by the proximity detector 24. The proximity detector is connected to conventional circuitry 37.

The curve of the target surface 30A is other than an arc centered on axis 36, so mechanical compensation is possible.

FIG. 3 shows a modified target member and proximity detector mounted on arms and 12 of extensometer 10. A proximity detector 44 which is constructed the same as detector 24 is mounted in a bracket 45 that includes a clamp 45A to hold the bracket relative to target member 46, which is mounted on arm 12 with a clamp 47. The target member 46 has a convex surface 48. The sensing end surface 49 of the proximity detector 44 is formed into a radius that generally corresponds to the radius of the surface 48, so that as the proximity detector moves, the effects of changing spacing at the outer peripheral edges of the proximity detector or probe, commonly called the fringe effects, are minimized. The center of the arc of surface 48 is also positioned so the gap between surface 48 and surface 49 of the proximity detector changes as the extensometer arms 11 and 12 pivot.

When using a capacitive reactance proximity detector such as those shown at 24 and 44, the sensing circuitry uses a constant current circuit system and the output will be variable voltage. With a constant current sensing circuit the voltage output from the circuitry 37, using capacitive reactance detectors 24 or 44, is basically linear with gap change except for second and third order effects, as distinguished from pure capacitance sensors.

Since it is known that even with the proximity detectors there is a certain nonlinear output in the constant current circuitry, due to "fringe" effects and the like, the target surfaces can be configured for compensation. In FIG. 1, a concave surface is shown as a target surface for a proximity detector and by making the radius of the surface 30A a smaller or larger radius than the radius of movement of the extensometer arms, nonlinear changes in the gap will result in variation in output signals which can be selected to compensate to a certain extent at least, nonlinearities of the constant current output circuitry. Using the extensometer geometry, one can vary the incremental change in spacing of the probe and target surface at different positions of the extensometer arms by moving the center of the arc of the curved concave surface 30A in a selected direction from its normal location, which would be generally along a bisecting plane of the flexure member 14. Usually, the center for the arc of surface 30A would be at a center point shown at 30B. The center of the arc for surface 48 is at a center point 50 so that as the extensometer arms 11 and 12 tend to separate, the proximity detector or probe then would move farther away from the target surface for each degree of pivoting of the arms as the spacing between the outer ends of the extensometer arms increases. The distance that the center 30B or the center 50 is offset vertically from the pivot axis 36 of the arms determines the gain or span of the output.

There is a nonlinearity in proximity probes or detectors such as those shown at 24 and 44. The proximity detectors have a slight droop to their output curve when output is plotted relative to spacing from a target surface, and this is primarily caused by fringe effects such as stray capacitive reactance signals along the edges of the detector as the spacing increases. By properly selecting the target surface curvature, and also selecting the position of the center of the curvature of the target surface relative to the pivoting axis of the arms, certain nonlinearities can be compensated for. A "best fit" approximation for linearity can be made by calibration and experimentation and some linearity compensation can be achieved by making the radius of the curvature of the target surface longer or shorter. For example, moving the center 30B or the center 50 horizontally from the position shown in FIGS. 1 and 3 will provide linearity compensation. Thus, the center of arc is located to achieve desired range or gain as well as some linearity compensation and the radius of the target surface also is selected to aid linearization.

Figure 5:
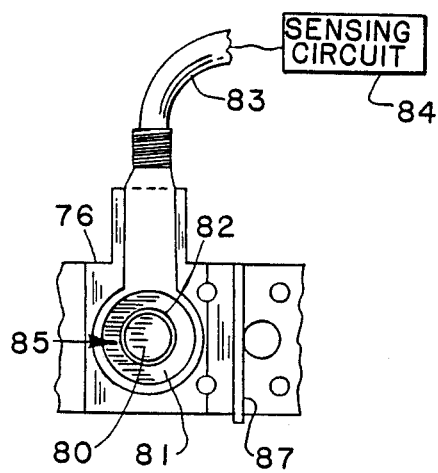
FIG. 5 is a bottom view of the probe of FIG. 4 taken on line 5—5 in FIG. 4.
Figure 6:
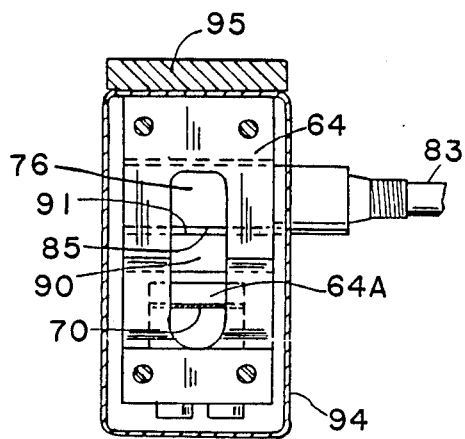
FIG. 6 is a sectional view taken on line 6—6 in FIG. 4.
Figure 8:
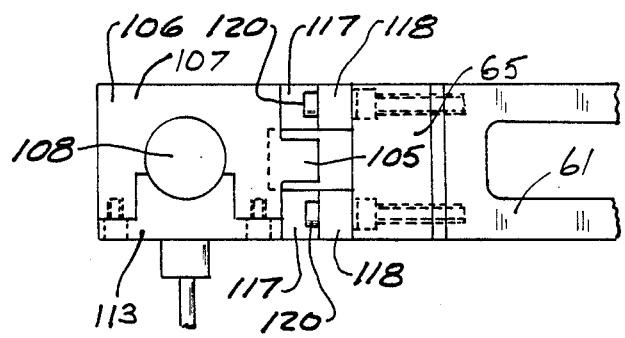
FIG. 8 is a fragmentary plan view of the device of FIG. 7.

In FIGS. 4, 5 and 6 a second form of the invention is shown, which comprises an extensometer 60 that has a first arm 61, and a second arm 62 made substantially similar to the arms previously mentioned, and which are joined together with respect to each other through the use of a cross-flexure mounting arrangement shown generally at 63. The cross-flexure arrangement includes a first flexure strap 64 that is clamped with a clamp block 65 to the outer end of the arm 61, and the opposite end of the flexure strap 64 is clamped with a suitable clamp 66 to the lower arm 62.

The block 65 has a depending leg, on which a second cross-flexure strap 70 is mounted. As can be seen in FIG. 6, the strap 64 has a central opening 64A through which the center part of the strap 70 passes. The strap 70 is narrowed down where it passes through the opening 64A, in a conventional manner, and the intersection point indicated generally at 72 of the flexure straps provides a hinge axis for movement of the outer ends of the arms 61 and 62. As shown, the outer ends of the arms carry knife points or specimen engaging members 73,73 which are engaging a specimen 74. As the specimen 74 is elongated (or shortened under compression), the arms will move relative to each other. The knife edges 73 are held against the specimen 74 in a suitable manner (not shown) such as spring clips, or even rubber bands that cause the knife edges to engage the side surface of the specimen 74.

A capacitive reactance sensing assembly 75 is mounted between the arms 61 and 62, and as shown includes a sensor detector module 76 that comprises a capacitive reactance type proximity detector of the general type previously explained. As can be seen in FIG. 5, the module 76 includes a central electrode 80, and an outer annular sleeve-type electrode or guard ring 81 which are separated by an insulating ring 82, usually of a ceramic material. The outer ring of the probe can be encased in a suitable ceramic insulating material as well, and leads 83 are provided for connection to circuitry 84 for sensing the output of the proximity detector 76.

The detector module 76 is held in place on the arm 61, adjacent to the flexure strap 64, and with the proximity sensing surface 85 facing toward the arm 62. The sensing surface 85 is formed into a concave shape having an axis generally parallel to the pivot axis 72, but offset therefrom by a selected distance. The detector module 76 includes a shield panel 87 at the edge thereof most closely toward the knife edges 73.

The sensing assembly 75 further includes a target member 90, which is mounted with a suitable clamp onto the arm 62 (screws such as those shown at 91 are passed through the arm 62 into the target). The target 90 is positioned to be in alignment with the detector module 76 and has a complementary exterior convex surface 91 on the upper surface thereof that mates with and is spaced from the concave surface 85 of the detector module 76 when the arms are in their "zero" or reference position as shown in FIG. 4.

The guard panel 87 overlaps the forward surface of the target 90, and minimizes the likelihood of foreign material getting into the gap area between the surfaces 85 and 91. The surface 91 can have an axis of curvature parallel to the arm pivot axis 72 but is offset from the pivot axis 72. Surface 91 has a configuration formed by having the axis for the surface adjacent to the axis used for generating the surface 85 when the arms 61 and 62 are compressed fully together. Mechanical compensation for nonlinearities in the sensing output can be obtained by changing the location of the center of radius of target surface 91 relative to the arm pivot axis 72. The linearity compensation of the output is changed by moving the center of the radius for the surface 91 in direction generally parallel to flexure strap 64, or up and down in FIG. 4.

The target surfaces do not have to have a uniform radius curve, but could have a changing radius along the surface. The surface 91 extends laterally across the extensometer and matches the width of the detector module.

An outer shield or housing 94 is provided over the cross-flexure assembly 63 and the sensor assembly 75, to shield and protect the components from foreign materials during use. This housing can be a deep drawn cover that fits over the end portion of the extensometer. The cover is made to have adequate clearance for relative movement between the arms 61 and 62, and is clamped in place onto the arm 61 using a clamp block 95 and suitable cap screws threaded into the arm 61.

While various methods of hinging the extensometer arms are possible, when using capacitive sensing it can be seen that any looseness or compliance in the hinge can be very detrimental. The cross flexure mounting is very rigid in resisting side to side arm movement and is thus very effective.

The electronics used may be commercially available capacitive sensing circuits.

Figure 7:
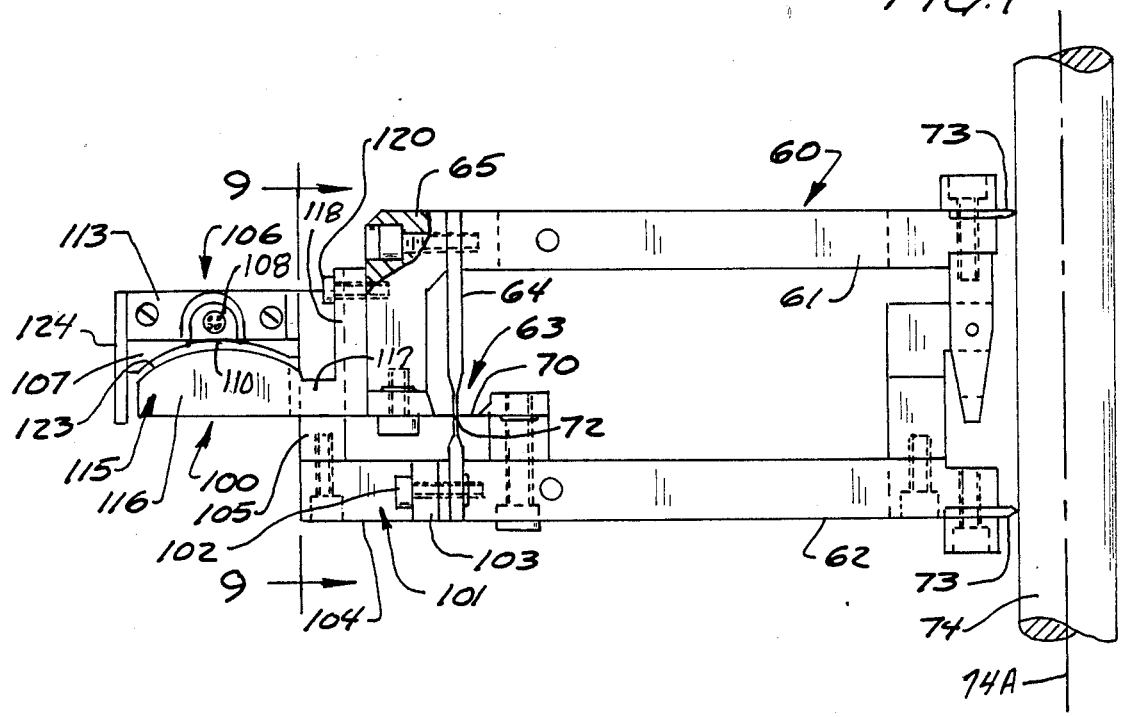
FIG. 7 is a side elevational view of an extensometer such as that shown in FIG. 4 with a capacitive reactance detector shown mounted on an opposite side of a pivot axis of the arms from the specimen.

In FIG. 7, a further modified form of the invention is shown. The base extensometer 60 is the same construction as that shown in FIGS. 4, 5 and 6, with some parts removed, and with a modified sensing arrangement. The extensometer 60 in this form of the invention has arms 61 and 62 which are joined together with a cross flexure arrangement 63. Flexure straps 64 and 70 are connected between arms 61 and 62, as explained before, and provide a hinge axis 72 for hinging or pivoting of the arms. Knife edge specimen contact members 73, 73 are carried at the first ends of the arms 61 and 62, respectively, and these engage a specimen 74, the strain of which is to be measured. The specimen is loaded axially along its specimen axis 74A, using conventional test frames or other loading means.

The flexure strap clamp block 65 that is used for clamping the upper end of the flexure strap 64 to arm 61 is used for mounting one portion (target 115) of a capacitive reactance sensing assembly illustrated at 100. In this form of the invention, the lower end of the flexure strap 64 is clamped to the arm 62 with a support member 101 using suitable cap screws 102. The support member 101 is also used for supporting a second portion of a capacitive reactance sensing assembly 100. The capacitive reactance sensing assembly 100 is thus positioned on an opposite side of a plane parallel to the specimen axis 74A and passing through the pivot axis 72, from the specimen 74.

Figure 9:
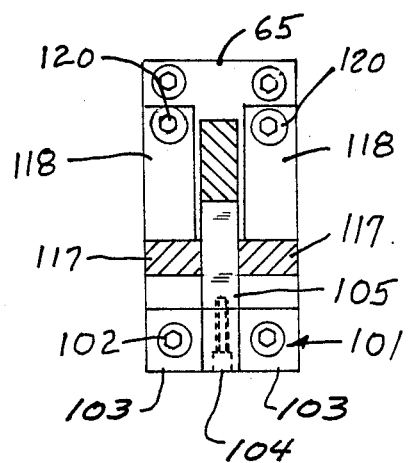
FIG. 9 is a sectional view taken as on line 9—9 in FIG. 7.

As shown, the block 101 is a T-shaped block that has ears 103, 103 (FIG. 9) which extend laterally from a center support arm 104 that extends rearwardly from the arm 62. The cap screws 102 pass through the ears 103, 103 to clamp the lower end of the flexure strap 64 in position and also hold the block 101 and thus arm 104 in place. The arm 104 in turn supports an upright column 105 forming an integral part of a capacitance reactance proximity detector module 106. Detector module 106 has a main block portion 107 that extends rearwardly from the column 105, and also includes a capacitive reactance type detector module or probe 108 of the type shown in the previous forms of the invention. The module has the annular rings at an end surface such as that shown in FIG. 5, which forms a lower sensing surface 110, that is concave as shown. The lower surface of block portion 107 is also concave. The module or probe 108 is held in place with a suitable bracket 113 that is attached to the block portion 107 in any suitable manner. The module 108 can be potted or cast in place, if desired.

The flexure strap clamp block 65 supports a target member 115, formed as a solid target block 116, which has two spaced apart arm portions 117, 117 at an inner end. The arms 117 are positioned on opposite sides of the upright column 105 supporting the proximity detector 108.

The arm portions 117 are supported from uprightly extending legs 118 which are fixed to the arms 117 and are spaced apart also. Legs 118 are fastened to the rear side of the clamp block 65 with suitable cap screws 120.

The target block 116 has a curved, convex exterior surface 123 which is complementary in shape to the concave sensing surface 110 formed on the end of module 108 and block portion 107. The surface 123 is spaced from the concave sensing surface 110 from the detector module 108 when the extensometer arms 61 and 62 are in their reference position, as shown in FIG. 7.

A guard panel 124 can be used at the outer end of the sensing assembly 100 to guard the gap between the sensing surface 110 and the target surface 123. The center of the radius of the target surface 123 is at a point offset from the arm pivot axis 72. The target surface 123 can be shaped and positioned as desired to provide mechanical compensation for detector nonlinearities and also to insure separation of the surfaces 110 and 123 as the extensometer arm ends at specimen contact members 73, 73 move relative to each other. The mounting for the capacitive reactance sensing assembly, as shown, is such that the gap between the sensing surface 110 and the target surface 123 will increase as the spacing between the specimen contact members 73 increases. Sufficient clearance between these surfaces can be provided to accommodate the normal amount of strain in a specimen. If desired, the target block 116 and proximity detector module 108 can be mounted to the arms 61 and 62 so the detector module 108 moves closer to the target surface 123 when the contact members 73 separate.

The sensing assembly 100 is positioned to the outside of a plane parallel to the specimen axis 74A and passing through the pivot axis 72. The capacitance reactance sensing assembly 100 is also exterior of the space defined by the perimeter of arms 61, 62 and between the pivot axis 72 and the specimen 74.

This arrangement places the sensor in locations which are easily accessible for service and observation.

Figure 10:
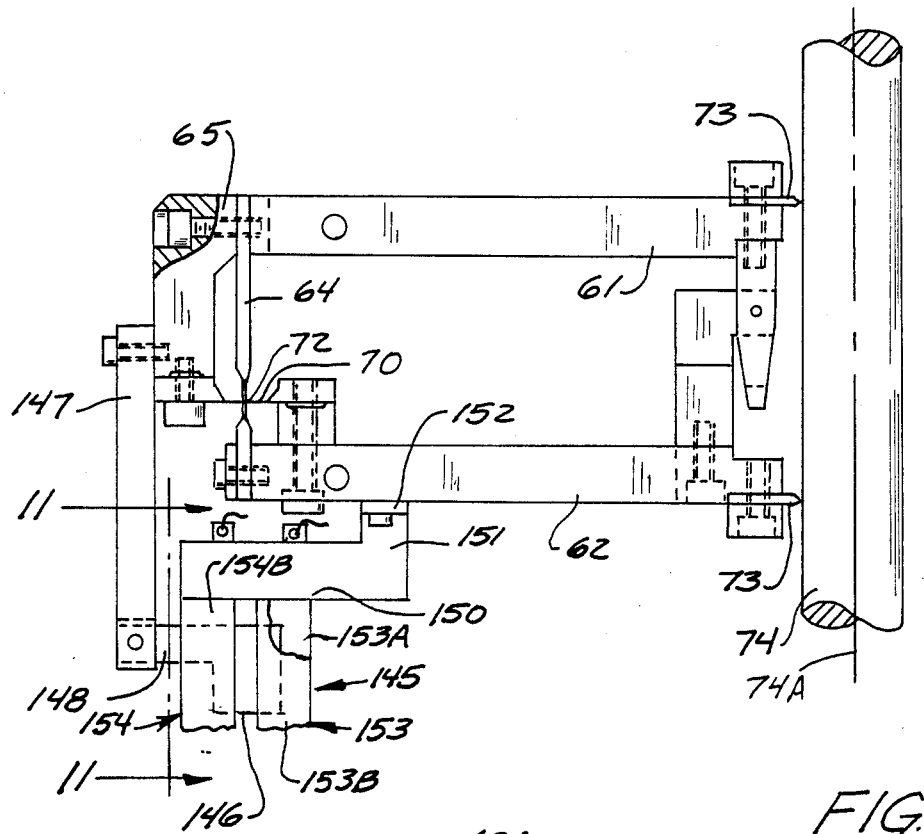
FIG. 10 is a side elevational view of an extensometer such as that shown in FIG. 4 with a further modified form of a capacitive sensor shown mounted below the sensing arms.
Figure 11:
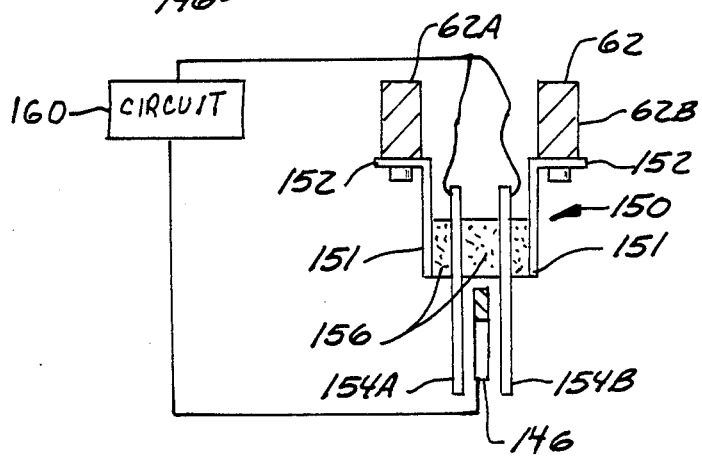
FIG. 11 is a sectional view taken as on line 11—11.

In FIGS. 10 and 11, a further modified form of the invention is shown. The structure of the extensometer arms 61 and 62 and cross flexure support is identical to that shown in FIG. 4, except that a different form of capacitive reactance sensor has been attached to the arms. The sensor is located to the exterior of the space defined by the periphery of the extensometer body comprising the upper and lower arms, the contact members 73, and the hinge or pivot axis 72. Flexure straps 64 and 70 are clamped to arms 61 and 62, as explained, to form the pivot axis 72, and contact members 73 are urged against the specimen 74.

In this form of the invention, the movement of the contact members 73, 73, when the specimen 74 is placed under strain, is sensed with a capacitance reactance sensor assembly shown at 145. The sensor assembly 145 uses capacitance principles with a moving plate as opposed to a proximity detector. The sensor assembly 145 includes a plate 146 which could be an active plate or a guard or shield plate, depending on the type of sensing desired, that is mounted onto the arm 61 through the mounting block 65. Plate 146 is supported on the mounting block with an arm 147 which can be mounted so as to insulate plate 146 or ground plate 146 as desired, depending on the type of sensing desired. The support arm 147 attaches to a tang member 148 that extends from the main part of the plate 146, as shown in FIG. 10. The connection between arm 147 and plate 146 is rigid in use, but can be made adjustable, if desired.

The arm 147 depends downwardly from the block 65 and the arm 61 to position below the lower arm 62, so that the plate 146, and rest of the capacitive type sensor assembly 145, are outside the space defined by the periphery of the extensometer arms.

Suitable cap screws can be used for attaching the arm 147 to the block 65 so that movement of the arm 61 relative to the arm 62 will cause shifting of the plate 146.

The capacitive type sensor assembly 145 has first and second spaced capacitor plate sets 153 and 154 formed into a plate assembly 150 that includes a pair of support legs 151, which have flanges 152 that are bent over and fastened to the lower sides of the bifurcated arm sections 62A and 62B of the extensometer arm 62 as shown in FIG. 11.

The capacitor plate assembly 150 includes the first capacitor plate set 153, formed by two parallel, spaced apart blades 153A and 153B that are mounted in an insulating potting material as shown at 156 and supported from the legs 151. The second capacitor plate set 154 is made up of two parallel blades 154A and 154B as seen in FIG. 11. These blades are also mounted in the potting material 156 and supported from legs 151.

The center plate 146 passes between the blades 154A and 154B, and also between the blades 153A and 153B which form the plate sets 154 and 153, respectively. The sets of blades are identically mounted in the potting material.

Sensor assembly 145 thus forms a differential capacitor, so that as the plate 146 moves between the capacitor plate sets 153 and 154, there is a change in capacitance between the plate sets 153 and 154. The changes in capacitance are sensed by a known differential capacitance sensing circuit 160, shown schematically. The electronics are commercially known and any desired type can be used. The capacitance plate assembly 150 can be adjusted longitudinally along the arm 62 to change the overlapping relationship of the plate 146 and the plate sets 153 and 154, but as shown, when the arms 61 and 62 move at their outer ends as the specimen 74 is strained, the plate 146 and the capacitance plate assembly 150 move relative to each other so that the common plate 146 will change in its amount of registry with the blades forming the respective plate sets 153 and 154, to change the capacitance output.

The plate 146 can be a grounded shield plate forming a sensor portion, if desired, with the blades 153B and 154B, which are on the same side of the plate 146, being connected as excitation plates. The blades 153A and 154A, which are on the opposite side of the plate 146 from the blades 153B and 154B, are electrically connected together to become effectively a single receiver plate. The position of the plate 146 would affect the sensed capacitive signal at the effectively single receiver plate formed of blades 153A and 154A to provide a change in output depending on the position of the plate 146. The receiver blades 153A and 154A, when they are connected together, are differentially shielded by plate 146 to cause an output as a function of the different amount of shielding of the blades 153A and 154A relative to the respective plates 153B and 154B. High level capacitance output signals which are very accurate can be obtained. Conventional sensing circuitry can be used.

Here, too, the capacitive reactance sensor assembly 145 is not between the arms 61 and 62, but rather is outside the perimeter of the arms and at least partially located on an opposite side of the plane which is parallel to the specimen longitudinal axis (which is also the loading axis) and passes through the pivot axis 72 of the extensometer arms, from the side of such plane on which the specimen 74 is located.

Capacitive sensing is thus usable at positions to the exterior of the extensometer arm periphery.

Although the present invention has been described with reference to preferred embodiments, workers skilled in the art will recognize that changes may be made in form and detail without departing from the spirit and scope of the invention.

What is claimed is:

1. A capacitive extensometer assembly comprising;
   a first mounting arm and a second mounting arm, each having first and second ends;
   means at said first ends of the mounting arms for engaging a specimen to be tested;
   means for pivotally connecting said first and second mounting arms together about a pivot axis at second ends thereof to hold the arms spaced apart to form an extensometer assembly for permitting relative movement along a reference axis at second ends of the mounting arms; and
   a capacitive reactance sensor mounted on the extensometer assembly to sense movement between the first and second mounting arms, said sensor including a first capacitive reactance sensor portion mounted on the first mounting arm, and a second capacitive reactance sensor portion mounted on the second mounting arm in alignment with said first capacitive reactance sensor portion, the first and second sensor portions being mounted to be spaced from the pivot axis, the sensor portions changing in relative position and means for providing an output indicating such change in positions of the sensor portions.

2. The capacitive extensometer assembly of claim 1 wherein the capacitive reactance sensor comprises means for mounting the first and second portions at a location spaced from the first ends of the mounting arms and to the exterior of the periphery defined by the mounting arms and the means for pivotally mounting.

3. The capacitive extensometer assembly of claim 1 wherein said first and second sensor portions are both at least partially on a first side of a plane passing through the pivot axis and parallel to an axis of loading of a specimen to be tested, the specimen being on an opposite side of the plane from the sensor portions.

4. The capacitive extensometer assembly of claim 1 wherein said first sensor portion comprises a capacitive reactance detector capable of detecting spacing with respect to a target surface, and wherein said second sensor portion comprises a member having a target surface in alignment with the capacitive reactance detector, such capacitive reactance detector and target surface being adjacent in a rest position of the mounting arms, and the capacitive reactance detector sensing changes in spacing of the detector from the target surface as the spacing at the first ends of the mounting arms changes, and both said capacitive reactance detector and said member having said target surface being mounted on an opposite side of a plane passing through the pivot axis of the arms and parallel to a loading axis of a specimen to be tested from the specimen.

5. An extensometer assembly comprising:
   a first arm and a second arm having longitudinally extending planes and first and second ends;
   hinge means connecting said first and second arms for movement about a hinge axis adjacent second ends of the first and second arms, the hinge axis being generally parallel to the longitudinally extending planes of the first and second arms;
   means at first ends of the first and second arms for engaging a specimen to be tested, which first ends change in spacing relative to each other as a specimen to which the arms are coupled is tested;
   first capacitive reactance means mounted on a first of said arms spaced from the hinge axis; and
   means defining a second capacitive reactance means mounted on the second arm spaced from the hinge axis to provide a surface adjacent the detector means which moves relative to the first capacitive reactance means, thereby providing an output as a function of changes in the relative position between the first and second capacitive reactance means.

6. An extensometer assembly as claimed in claim 5, wherein said first capacitive reactance means is mounted on a first of said arms and comprises a proximity detector, and the second capacitive reactance means comprises a target surface mounted on the second arm, said target surface aligning with and being adjacent the proximity detector, said proximity detector and target surface being positioned on an opposite side of a plane passing through the hinge axis and perpendicular to the longitudinally extending planes of the first and second arms from the side of such plane on which the first ends of said arms are located.

7. The extensometer assembly of claim 6, wherein the spacing between said proximity detector and target surface increases when the first ends of the arms increase in spacing as the arms pivot about the hinge axis.

* * * * *